United States Patent [19]
Banks et al.

[11] 3,740,586
[45] June 19, 1973

[54] PULSE WIDTH - DC CONVERTER COMPENSATING FOR PULSE REPETITION RATE CHANGES

[75] Inventors: Robert B. Banks, Bellevue; Roger E. Baker, Redmond, both of Wash.

[73] Assignee: Electro Development Corporation, Lynnwood, Wash.

[22] Filed: Dec. 13, 1971

[21] Appl. No.: 207,298

[52] U.S. Cl.............. 307/229, 73/231 M, 307/233, 307/235, 307/271, 328/127, 328/151
[51] Int. Cl.......................... G06g 7/12, H03k 5/00
[58] Field of Search............... 173/231 M; 307/228, 307/229, 231, 233, 234, 235, 265, 271; 328/127, 151, 181

[56] References Cited
UNITED STATES PATENTS

| | | | |
|---|---|---|---|
| 3,333,109 | 7/1967 | Updike | 328/151 X |
| 3,577,007 | 5/1971 | Cross | 307/228 |
| 3,602,825 | 8/1971 | Senior | 307/229 X |

*Primary Examiner*—Stanley D. Miller, Jr.
*Attorney*—Christen & Sanborn

[57] ABSTRACT

A signal conditioner particularly useful for providing an output DC signal from the drum and impeller signals of a motorless fuel flow transmitter includes a pulse shaper providing a series of output pulses whose width is proportional to the time difference between the drum and impeller signals and whose repetition rate is variable in response to the frequency thereof. At the leading edge of each output pulse, a reference voltage is connected to the input of an integrator which thereafter produces a ramp waveform at its output. The operation of the integrator is stopped at the trailing edge of each output pulse and the signal stored on the integrator output is sampled and held in a storage capacitor shortly thereafter. The stored voltage is then applied through an output stage as a continuous DC output signal proportional to the average pulse width of the output pulses from the pulse shaper. To avoid erroneous indications, a detector clamps the output voltage of the integrator at the negative reference voltage when the rotational speed of the fuel flow transmitter, and therefore the repetition rate of the output pulses from the pulse shaper, falls below a predetermined level.

7 Claims, 7 Drawing Figures

3,740,586

PULSE WIDTH - DC CONVERTER COMPENSATING FOR PULSE REPETITION RATE CHANGES

FIELD OF THE INVENTION

This invention generally relates to pulse width-DC converters, and, more particularly, to such a converter particularly applicable for use in a signal conditioner for a motorless fuel flow transmitter.

BACKGROUND OF THE INVENTION

Motorless fuel flow transmitters are generally applicable for the measurement of the mass flow rate of fuel passing through a conduit. Transmitters of this type include a first turbine or "drum" which is situated in the fuel flow path and which in turn is connected to a second turbine, or impeller, by a linear torsion spring. It is well known that the angular momentum imparted to the fuel by the reaction of the impeller causes a relative time displacement, or angular displacement, between the drum and impeller. For a more detailed discussion of these principles, together with details of an exemplary embodiment thereof, reference should be made to a copending application of Leroy Vetsch, entitled FLOWMETER, U.S. Ser. No. 116,492, filed FEB. 18, 1971, which is also assigned to the assignee of the present invention.

Mass fuel flow rate information is obtained in the prior art by measuring the elapsed time from the passage of a point on the drum past a fixed reference to the passage of a corresponding point on the impeller past the same fixed reference. Electrical signals represnting the passages may be obtained by either electrical contacts, or preferably by magnetic sensors.

It is desirable to measure the mass flow rate of the fuel by, first, obtaining a pulse proportional to this elapsed time, and, second, converting that pulse width into an equivalent DC signal. Although this conversion is straightforward in situations where the velocity of the fluid is relatively constant, it is difficult to obtain in situations where the velocity varies widely. In the latter case, the frequency of the electrical signals varies in proportion to the change in fuel velocity. In such a situation, the output pulses cannot be treated by conventional pulse width DC conversion techniques.

As a result, the motorless transmitter usually is limited to applications in which relatively constant fuel velocity is present. In situations where fuel velocity varies over a wide range, the more expensive and complicated type of fuel flow transmitter using an externally-driven drum have been utilized.

It is therefore an object of this invention to provide a linear conversion between pulse width and DC level.

It is a further object of this invention to provide such a linear conversion despite changes in the repetition rate of the pulses.

It is yet a further object of this invention to provide a signal conditioner for a motorless fuel flow transmitter which allows such a transmitter to be used to measure mass flow rates of fuels having a variable velocity.

It is another object of this invention to provide a signal conditioner for a motorless fuel flow transmitter which includes means compensating for erroneous output signals resulting from noise or failure of the transmitter to rotate.

It is yet another object of this invention to provide an apparatus for averaging the signal content of successive pulses despite changes in the repetition rate thereof.

SUMMARY OF THE INVENTION

These objects and others are achieved, briefly, by first sensing the time differences between corresponding points on the drum and impeller signals from a motorless fuel flow transmitter, and producing an output rate pulse having constant amplitude and variable width for each cycle thereof, and converting the width of each of said rate pulses to a continuous DC signal by integrating a constant reference voltage during the time period of each rate pulse, sampling the integrated voltage at the end of each rate pulse, and modifying the signal levels stored in an output stage in proportion to said sampled voltage.

BRIEF DESCRIPTION OF THE DRAWINGS

The invention can perhaps best be understood by reference to the following portion of the specification, taken in conjunction with the accompanying drawings, in which.

BRIEF DESCRIPTION OF A PREFERRED EMBODIMENT

Figure 1:
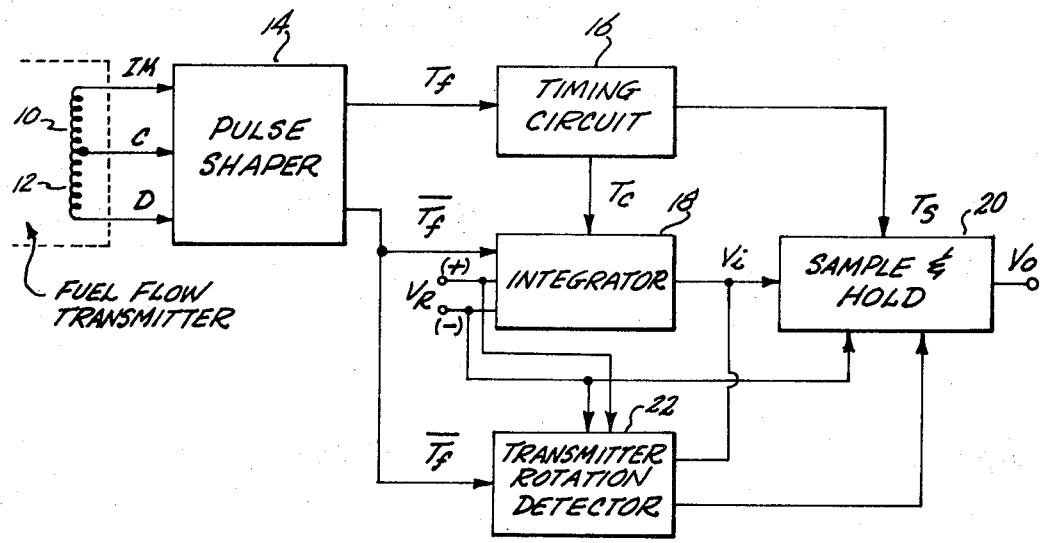
FIG. 1 is a block diagram of a signal conditioner for a motorless fuel flow transmitter using the apparatus of this invention.
Figure 3:
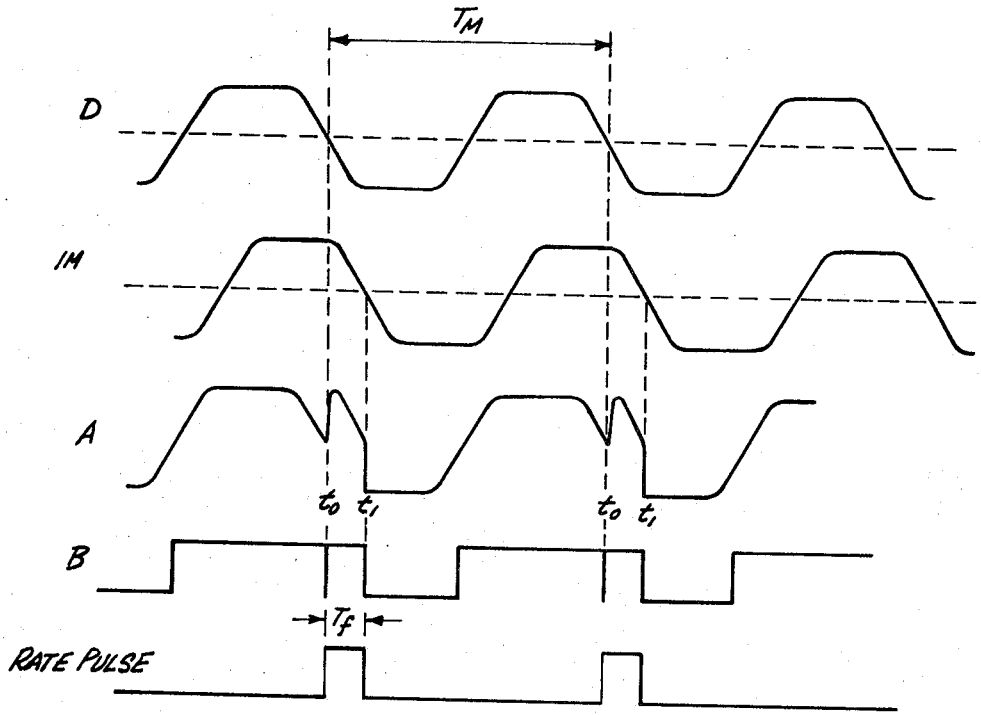
FIG. 3 is a timing diagram illustrating the operation of the pulse shaper of FIG. 2.

With reference now to FIG. 1, a fuel flow transmitter of the motorless type, as more particularly detailed in the aforementioned copending patent application, includes pick-off coils 10, 12 which produce an output signal in response to the passage of permanent magnets on the impeller and drum, respectively. Coils 10 and 12 have one end thereof connected together to a common lead C. The signals appearing on the other leads, IM, D, comprise quasi-sinusoids whose frequency is determined by the speed of rotation of the drum and impeller assembly, and therefore, by the velocity of the fuel whose flow rate is to be measured. With reference now to FIG. 3, the signals on terminals D and IM are shown for a given fuel velocity resulting in a periodicity $T_M$ for each signal. With a change in fuel velocity, the periodicity $T_M$ will change. However, the relative time displacement between the signals on terminals D and IM is generally a function only of mass flow rate and thus not related to fuel velocity.

In order to measure this relative time displacement and yet obtain an output signal which is independent of fuel velocity changes, the drum and impeller signals are applied to a pulse shaper 14 which develops therefrom a series of rate pulses $T_f$, and inverted rate pulses $\overline{T_f}$, whose repetition rate is determined by the periodicity $T_M$, whose amplitude is constant, and whose width is proportional to the time displacement between the signals on terminals D and IM.

The rate pulses $T_f$ are supplied to a timing circuit which develops therefrom timing pulses $T_c$ and $T_s$ for controlling the operation of an integrator 18 and a sample-and-hold circuit 20. The inverted rate pulses $\overline{T_f}$, which are the logical inverse of the rate pulses $T_f$, are applied to the integrator 18 and to a transmitter rotation detector 22. The integrator is also supplied with a reference voltage $V_R$ from a voltage source, not illustrated, whose negative terminal is also connected to sample-and-hold circuit 20 and to transmitter rotation detector 22 for establishing a common system reference.

In operation, the integrator is discharged prior to the occurrence of the inverted rate pulse $\overline{T_f}$ by the timing pulse $T_c$ so that the output voltage $V_i$ remains at the reference voltage $V_R$. At the occurrence of the leading edge of the inverted rate pulse $\overline{T_f}$, the integrator is switched on and thereafter the output voltage $V_i$ rises at a linear rate. At the trailing edge of the inverted rate pulse $\overline{T_f}$, the integration is stopped. The magnitude of the voltage $V_i$, with respect to the reference $V_R$, is proportional to the width of the inverted rate pulse $\overline{T_f}$. $V_i$ is sampled by the sample-and-hold circuit in response to the timing signal $T_s$ and the voltage transferred through a filter circuit to a storage capacitor within sample-and-hold circuit 20. The change in sampled voltage, if any, between successive pulses, is thereby averaged to provide a continuous output voltage $V_o$ which is proportional to the average pulse width of successive rate pulses, and therefore to the desired mass flow rate.

The transmitter rotation detector 22 compares the repetition rate of the inverted rate pulses $\overline{T_f}$ and effectively clamps the output of the integrator $V_i$ to the reference voltage $V_R$ when the repetition rate is below a predetermined value.

Figure 4:
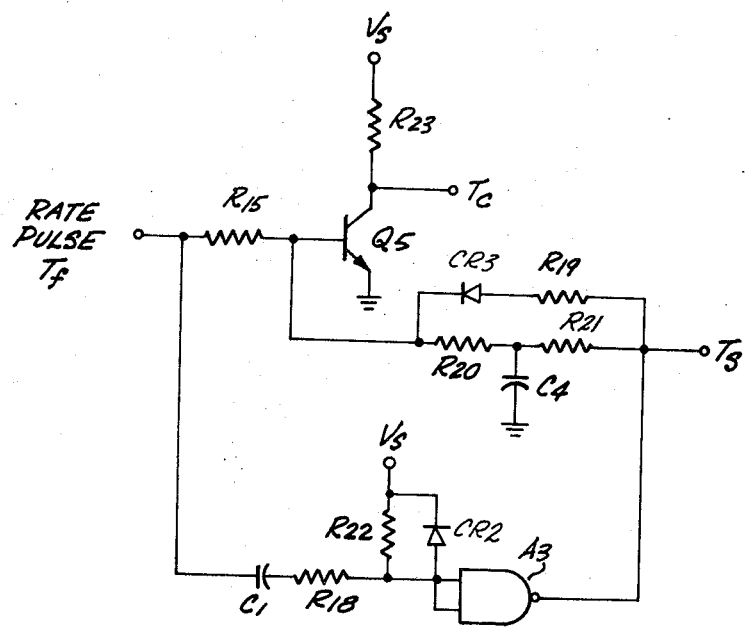
FIG. 4 is a combined schematic and block diagram of the timing circuit in FIG. 1.
Figure 5:
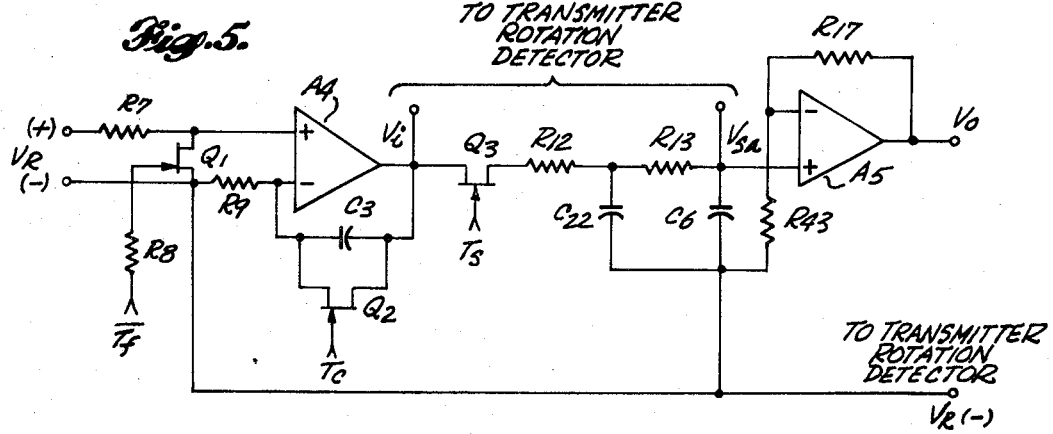
FIG. 5 is a combined schematic and block diagram of the integrator and sample-and-hold circuits in FIG. 1.
Figure 6:
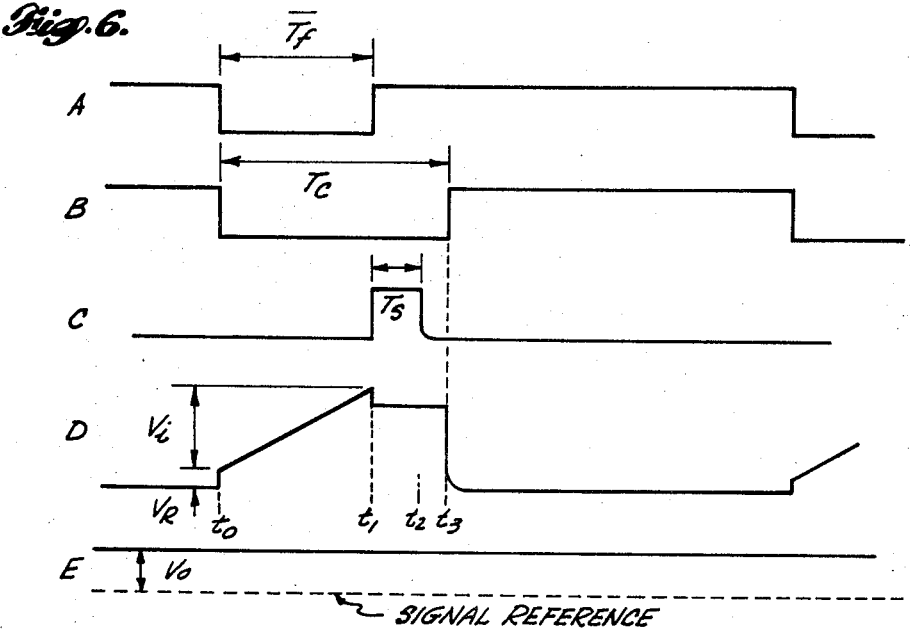
FIG. 6 is a timing diagram illustrating the operation of the timing circuit, integrator, and sample-and-hold circuits.

This operation can perhaps better be understood, together with additional details of the operation, by reference to the specific embodiments of FIGS. 2, 4, 5 and 7, together with the accompanying timing diagrams in FIGS. 3 and 6.

Figure 2:
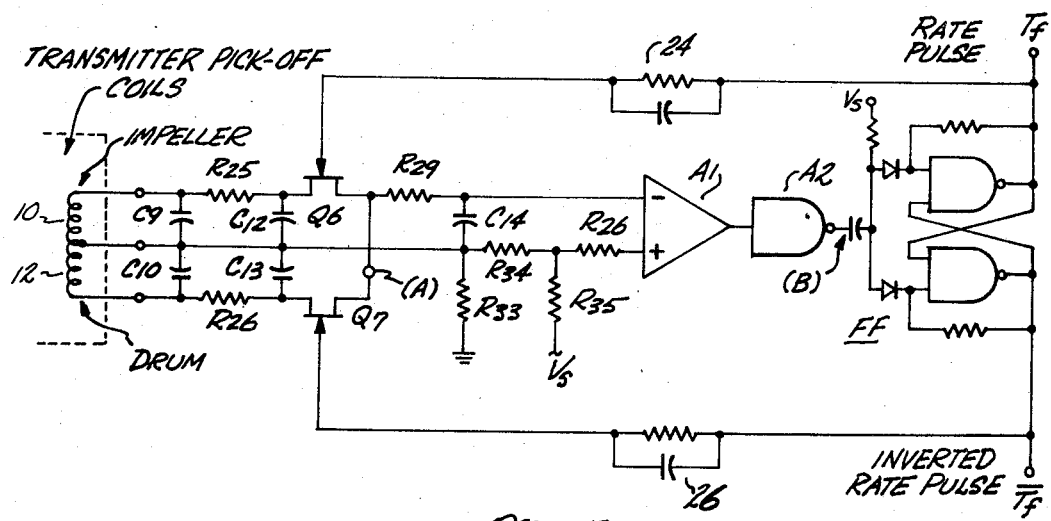
FIG. 2 is a combined schematic and block diagram of the pulse shaper of FIG. 1.

With reference now to FIG. 2, the common terminal C of the fuel flow transmitter is connected to a reference for the pulse shaper which is developed from a supply voltage $V_s$ through a voltage divider including resistors R33, R34, and R35. The outputs of the drum, impeller and pick-off coils 10, 12, appearing on leads IM, D, are connected through identical input RC filter networks to the source electrodes of corresponding field effect transistors Q6, Q7. The RC filter network for the impeller signal comprises a capacitor C9, a resistor R25 and a capacitor C12, and the RC filter network for the drum signal comprises capacitor C10, and resistor R26, and a capacitor C13. The function of these RC filters is to remove EMI components from the impeller and drum signals, which may form a substantial portion of noise at low flow velocities.

The drain electrodes of transistors Q6 and Q7 are tied to a common junction A which is coupled through a resistor R29 to the inverting input of an operational amplifier A1. Resistor R29, together with a capacitor C14 connected from the inverting input of operational amplifier A1 to the pulse shaper reference, form a second filter network.

A threshold voltage is developed from a voltage divider network connected to the source voltage $V_s$, and more particularly, from the common junction of resistors R34 and R35. This threshold voltage is connected to the non-inverting input of amplifier A1 by a resistor R26. In practice, the magnitude of this threshold value may be set at a predetermined low value with respect to the reference of the pulse shaper.

The output of comparator A1 is inverted by an inverter A2, whose output is designated by reference B, and applied to the input of a toggle flip-flop FF of conventional configuration. The rate pulses $T_f$ appear on a first output of flip-flop FF and the inverted rate pulses $\overline{T_f}$ appear on a second output thereof. The rate pulses $T_f$ are coupled back to the gate electrode of the field effect transistor Q6 by a filter network 24, and the inverted rate pulses $\overline{T_f}$ are coupled back to the gate electrode of the field effect transistor Q7 by a second filter network 26.

Let it be assumed that field effect transistor Q7 is in a conducting condition so that the drum signal, as filtered by the EMI filter network, appears on common junction A. As the filtered drum signal begins to decrease in magnitude, the signal on junction A likewise decreases. When the signal on junction A reaches a threshold value established by the threshold signals applied to the comparator A1, the inverted output of comparator A1 appearing at junction B switches in a negative direction, as best seen in FIG. 3. This negative pulse causes the flip-flop FF to assume its first state in which the logic level of the rate pulse output is a logic 1 and the logic level of the inverted rate pulse output is a logic 0. Accordingly, transistor Q7 is turned off, and transistor Q6 is turned on. At this time, as best seen in FIG. 3, the magnitude of the signal at junction A is equal to that of the filtered impeller signal as coupled through transistor Q6. As a result, the logic level at the junction B again becomes positive.

When the magnitude of the signal at junction A has again decreased to the threshold value, the output of the comparator, as seen at junction B, switches to a negative value. This second negative pulse places the flip-flop FF in its second state, whereupon a logic 1 is present at the rate pulse output and a logic 0 at the inverted rate pulse output. Therefore, transistor Q7 is turned on and transistor Q6 is turned off. During the remainder of the cycle $T_M$, the signal at junction B does not again change from a positive to a negative state. Therefore, flip-flop FF remains in its second state until the drum signal again becomes positive, then decreases to the threshold value.

As a result, a series of constant amplitude rate pulses $T_f$ and inverted rate pulses $\overline{T_f}$ are produced whose repetition rate is determined by the period $T_M$ and whose pulse width is proportional to the time displacement between the drum and impeller signals.

With reference now to FIGS. 4 and 6, two timing pulses $T_c$, $T_s$ are generated from the rate pulse $T_f$. (For purposes of convenience and later explanation, the inverted rate pulse $\overline{T_f}$ is shown in FIG. 6.) The timing pulse $T_c$ is taken from the collector of a transistor Q5 whose emitter is tied to reference or logic 0 potential. Therefore, during the time period of the rate pulse $T_f$, the timing pulse $T_c$ is a logic 0, as transistor Q5 is maintained in a conducting condition by the rate pulse through resistor R15. When the rate pulse $T_f$ becomes a logic 0 (and the inverted rate pulse $\overline{T_f}$ a logic 1), a charging path is provided for a capacitor C1 from the voltage source $V_s$ through resistors R22 and R18. Accordingly, the resultant negative pulse is inverted by an inverter A3 and appears as a sample pulse $T_s$ of positive polarity. The duration of the sample pulse $T_s$ is fairly short, on the order of 6 milliseconds.

The sample pulse $T_s$ is fed back through a resistor R19 and a diode CR3 to maintain transistor Q5 in a conducting condition. Therefore, the timing pulse $T_c$ is extended by the duration of the sample pulse $T_s$. In addition, the sample pulse $T_s$ is applied to charge a second capacitor C4 through a resistor R21. When the sample pulse $T_s$ falls to a logic 0, the current supplied upon the discharge of capacitor C4 through a resistor R20 serves to maintain transistor Q5 in a conducting condition for an additional short time period. For example, this additional period may be 1 millisecond. At a point in this discharge, transistor Q5 becomes non-conducting to terminate pulse $T_c$.

In FIG. 5, a source of a reference voltage $V_R$, not illustrated, has its positive terminal coupled to the non-inverting input of an amplifier A4 by resistor R7. The negative terminal of source $V_R$ is likewise connected to the inverting input of amplifier A4 by resistor R9. A field effect transistor Q1 has its source and drain electrodes placed in shunt with the non-inverting input of amplifier A4 and one end of resistor R9 and has its gate electrode connected to the inverted rate pulses $\overline{T_f}$ through a resistor R8. Amplifier A4 functions as an integrator, with a capacitor C3 connected in a negative feedback manner between the output and inverting input thereof. A field effect transistor Q2 has its source and drain electrodes in shunt with capacitor C3 and in turn is controlled by the timing pulse $T_c$.

The output of the amplifier A4, which comprises the integrator output $V_i$, is coupled through the source and drain electrodes of a field effect transistor Q3 to a filter and storage network comprising resistors R12 and R13, and capacitor C22 and C6. The signal appearing on the common junction of resistor R13 and capacitor C6 is denoted $V_{sa}$. This common junction is connected to the non-inverting input of an operational amplifier A5, on whose output terminal the circuit output $V_o$ appears. The circuitry from the input of transistor Q3 to the output of amplifier A5 comprises the sample-and-hold circuit 20 and is referenced to the negative terminal of the reference voltage supply $V_R$ through a connection to the common junction of capacitor C22 and C6, and through a resistor R43 to the inverting input of amplifier A5. The gate of amplifier A5 is adjusted by a resistor R17 connected in a negative feedback mode between the output and inverting input thereof.

In operation, the field effect transistor Q1 is normally conducting, by virtue of the inverted rate pulse $\overline{T_f}$ being in a logic 1 state. Accordingly, the reference voltage $V_R$ is blocked from the input of amplifier A4. During the larger portion of this time period, the feedback capacitor C3 is shunted by transistor Q2 as the signal $T_c$ presented to its gate electrode is also normally a logic 1.

When the inverted rate pulse $\overline{T_f}$ goes to logic 0 at the start $t_0$ of the measurment interval, transistor Q1 is turned off and accordingly the reference voltage $V_R$ is applied to the input of amplifier A4. Simultaneously, the timing pulse $T_c$ becomes a logic 0 so that transistor Q2 is turned off, removing the shunt from feedback capacitor C3. As a result, the output voltage of the integrator, $V_i$, increases linearly with time. It can be shown by well-known relations that the magnitude of the output voltage $V_i$ equals a constant multiplied by the time period of integration, assuming that the magnitude of the reference voltage $V_R$ is also constant. The magnitude of this constant is determined by the values of $V_R$, R9 and C3. Therefore, at time $t_0$, the output of the integrator $V_i$ begins to rise.

At time $t_1$, which is coincident with the change in the inverted rate pulse $\overline{T_f}$ back to a logic 1, the transistor Q1 is again turned on, blocking the reference voltage $V_R$ from the amplifier A4. The output voltage $V_i$ immediately drops by an amount equal to the reference voltage $V_R$. However, the charge that has been accumulated during the integration cycle is retained on capacitor C3, as transistor Q2 is still in a non-conducting condition. Between times $t_1$ and $t_2$, the sample pulse $T_s$ occurs so as to transfer this voltage $V_i$ to the storage cpaacitor C6 by virtue of conduction of transistor Q3. At time $t_3$, the timing pulse $T_c$ again becomes a logic 1, thereby placing transistor Q2 in a conducting condition so as to discharge feedback capacitor C3, thereby resetting the integrator for another cycle of operation. However, the operation of transistor Q2 has no effect upon the sampled voltage, as transistor Q3 has previously been placed in a non-conducting state at time $t_2$ when sample pulse $T_s$ becomes a logic 0.

The voltage stored in capacitor C6 is transferred through amplifier A5 and appears as output voltage $V_o$. Amplifier A5 acts as an output buffer whose gain is determined by the ratio of the values of resistors R17 and R43.

When the inverted rate pulse $\overline{T_f}$ again becomes a logic 0, the cycle thus described is repeated. Any change in the integrated voltage $V_i$ is filtered through the network comprising resistors R12 and R13 and capacitor C22, and during sampling modifies the voltage on capacitor C6 so that a continuous output voltage $V_o$ is obtained. Because the voltage stored in capacitor C6 is determined only by the width of the rate pulses $T_f$, the output voltage $V_o$ is insensitive to changes in the pulse repetition rate.

Figure 7:
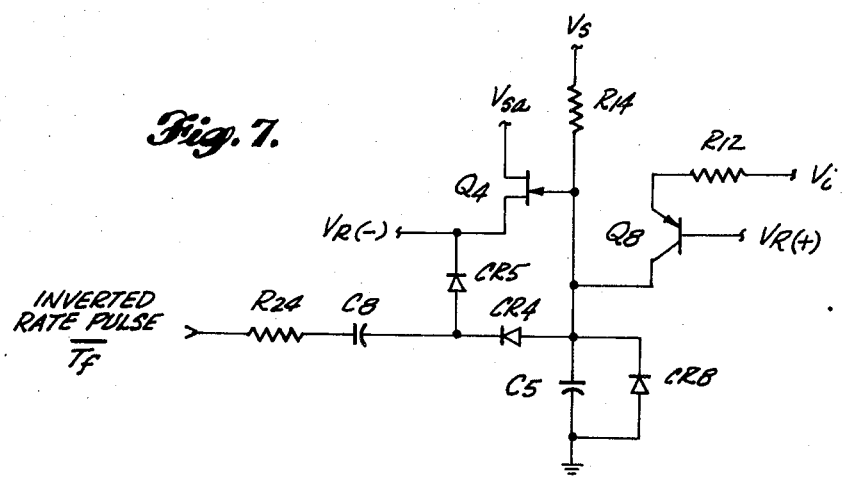
FIG. 7 is a schematic diagram of the transmitter rotation detector in FIG. 1.

A transmitter rotation detector 22 finds particular applicability in providing stable indications under certain conditions of fuel flow encountered with motorless fuel flow transmitters. With reference now to FIG. 7, a capacitor C5 is charged from the voltage source $V_s$ through a resistor R14. The magnitude of the voltage across capacitor C5, however, is limited by the inverted rate pulses $\overline{T_f}$, which are coupled through the series connection of a resistor R24, a capacitor C8, and a diode CR4 to one side of capacitor C5. When the inverted rate pulses $\overline{T_f}$ go to logic 0, capacitor C5 is discharged for the duration of that logic state. As the flow rate decreases below a certain value, as established by the time constants of the charging circuit including resistor R14 and capacitor C5, and the discharge circuit including capacitor C5, capacitor C8 and resistor R24, the voltage on capacitor C5 increases. When the magnitude of the voltage on capacitor C5 exceeds the value of the negative reference $V_R(-)$, a field effect transistor Q4 is placed in a conducting condition. Transistor Q4 is connected to the voltage $V_{sa}$ in FIG. 5. When transistor Q4 is conducting, the voltage $V_{sa}$ is clamped at the negative reference voltage $V_R(-)$, and accordingly the output voltage $V_o$ is zero.

When the fuel flow transmitter is beginning to start or is stopping, a condition may exist which causes the output rate pulse $T_f$ of the pulse shaper 14 to comprise a square wave. The repetition rate of this square wave is twice the repetition rate of the drum or impeller signals. Without compensation, the resultant pulse width would represent a flow rate greater than the maximum flow rate obtainable with the device and the output of the integrator $V_i$ would climb to a very large value. To compensate, the integrator voltage $V_i$ is supplied by a resistor R12 to the emitter of a transistor Q8 whose base is connected to the reference voltage $V_R(+)$. The collector of transistor Q8 is tied directly to one side of capacitor C5. When the integrator voltage $V_i$ exceeds the supply voltage $V_s$, transistor Q8 conducts to charge capacitor C5. As before, when the voltage across capacitor C5 exceeds the negative reference voltage $V_R(-)$, transistor Q4 conducts, thereby clamping the voltage $V_{sa}$ at the negative reference and maintaining the output voltage $V_o$ equal to zero.

We claim:

1. An apparatus for converting the average pulse width of a series of pulses having a variable repetition rate into a continuous DC signal, comprising:
   a. means shaping each of said pulses into a corresponding rectangular pulse,
   b. integrating means for producing an output signal having a ramp waveform in response to each of said rectangular pulses,
   c. sampling means operative to sample said output signal at the termination of each of said rectangular pulses,
   d. means storing said sampled output signals to produce a continuous DC signal, and
   e. means resetting said integrating means after each operation of said sampling means.

2. An apparatus as recited in claim 1, wherein said integrating means includes a source of a reference voltage, an integrator including an input and an output, a switching means operative to connect said source of reference voltage to the input of said integrator for the duration of each of said rectangular pulses, whereby said output signal is provided on said integrator output.

3. A signal conditioner for a motorless fuel flow transmitter which includes first and second means providing electrical output signals representing, respectively, the speed of rotation of drum and impeller assemblies of the transmitter, wherein the relative time displacement between said first and second electrical signals is proportional to the mass flow rate of fuel through the transmitter, including:
   a. pulse shaping means providing a series of rectangular output pulses from said first and said second electrical signals, the width of each of said rectangular output pulses being proportional to the instantaneous time displacement between said first and said second electrical signals,
   b. an integrating means for producing an output signal having a ramp waveform in response to each of said rectangular output pulses,
   c. timing means for developing from each of said rectangular output pulses a timing pulse and a sample pulse, said sample pulse being produced for a short time interval following the termination of each of said rectangular output pulses, and said timing pulse being produced a short time after the termination of each of said sample pulses,
   d. means sampling said output signal in response to each of said sample pulses,
   e. means storing said sampled output signals to thereby provide a continuous DC output proportional to mass flow rate, and
   f. means resetting said integrating means in response to each of said timing pulses.

4. A signal conditioner as recited in claim 3, wherein said pulse shaping means includes first and second filter networks for removing noise from said first and second electrical signals, first and second transistor switches, each of said transistor switches having input, output and control terminals, the input terminal of said first transistor switch being coupled to said first filter network and the input terminal of said second transistor switch being coupled to said second filter network, a comparator having input and output terminals, means coupling the output terminals of said first and second transistor switches in common to the input terminal of said comparator, said comparator providing an output pulse whenever the level of either of said first or said second electrical signals passes a predetermined threshold value, a bistable switching means having an input terminal and first and second output terminals and being operative to switch an output pulse from one of said output terminals to the other of said output terminals in response to each of said output pulses from said comparator, and means connecting said first output terminal to the control terminal of said first transistor switch and said second output terminal to the control terminal of said second transistor switch, whereby said series of rectangular output pulses are produced on one of said first or second output terminals.

5. The signal conditioner as recited in claim 3, wherein said integrating means comprises a source of a constant reference voltage, an operational amplifier having inverting and non-inverting inputs, and an output, a switching means coupling said source of constant reference voltage across said amplifier inputs for the duration of each of said rectangular output pulses, and a feedback capacitor connected between said amplifier's output and inverting input, and wherein said resetting means comprises a third transistor switch having input, output and control terminals, said input and output terminals of said transistor switch being connected in parallel with said feedback capacitor, and said timing pulses being supplied to said control terminal such that said third transistor switch shunts said feedback capacitor in response to each of said timing pulses, whereby said output signal is provided at the output of said amplifier.

6. The signal conditioner as recited in claim 3, further comprising a transmitter rotation detector which includes a timing means for providing a control signal at a predetermined time after the termination of each of said rectangular output pulses, means inhibiting said timing circuit if the initiation of each of said rectangular output pulses occurs before said predetermined time period, and means responsive to said control signal to maintain the level of said DC output signal proportional to zero mass flow rate.

7. A signal conditioner as recited in claim 6, wherein said transmitter rotation detector further includes means establishing a threshold signal value, and detector means providing said control signal when the level of said output signal of said integrating means exceeds said threshold signal value.

* * * * *